United States Patent
Fedak et al.

(10) Patent No.: US 9,541,043 B2
(45) Date of Patent: Jan. 10, 2017

(54) HYDROCARBON ADSORBER AND RELATED MANUFACTURING METHODS

(71) Applicant: MANN+HUMMEL GMBH, Ludwigsburg (DE)

(72) Inventors: Erich Fedak, Kalamazoo, MI (US); Timothy Molascon, Kalamazoo, MI (US); Jason Worrall, Portage, MI (US)

(73) Assignee: MANN+HUMMEL GMBH, Ludwigsburg (DE)

( * ) Notice: Subject to any disclaimer, the term of this patent is extended or adjusted under 35 U.S.C. 154(b) by 0 days.

(21) Appl. No.: 14/674,074

(22) Filed: Mar. 31, 2015

(65) Prior Publication Data

US 2016/0290292 A1 Oct. 6, 2016

(51) Int. Cl.
*B01D 53/02* (2006.01)
*F02M 35/02* (2006.01)

(52) U.S. Cl.
CPC ..... *F02M 35/0218* (2013.01); *F02M 35/0202* (2013.01); *B01D 2257/702* (2013.01)

(58) Field of Classification Search
CPC ............ F02M 35/0218; F02M 35/0202; B01D 2257/702
See application file for complete search history.

(56) References Cited

U.S. PATENT DOCUMENTS

| | | | | |
|---|---|---|---|---|
| 4,386,947 A * | 6/1983 | Mizuno | .............. | B01D 53/02 123/519 |
| 5,417,743 A * | 5/1995 | Dauber | .............. | B01D 46/10 360/99.15 |
| 5,593,482 A * | 1/1997 | Dauber | .............. | B01D 53/0407 55/385.6 |
| 6,113,864 A * | 9/2000 | Kueper | .............. | B01D 53/9472 29/890 |
| 6,214,095 B1 * | 4/2001 | Logan | .............. | B01D 53/0407 55/385.6 |
| 7,597,745 B2 * | 10/2009 | Lebowitz | .............. | B01D 53/02 55/385.3 |
| 8,147,599 B2 * | 4/2012 | McAlister | .............. | F17C 11/005 206/0.7 |
| 9,409,126 B2 * | 8/2016 | McAlister | .............. | F17C 11/005 |
| 2002/0194990 A1 * | 12/2002 | Wegeng | .............. | B01D 53/06 95/114 |
| 2004/0060447 A1 * | 4/2004 | Powell | .............. | B01D 53/0407 96/154 |

(Continued)

FOREIGN PATENT DOCUMENTS

| | | |
|---|---|---|
| CN | 203090549 U | 7/2013 |
| GB | 1225751 A | 3/1971 |

*Primary Examiner* — Christopher P Jones
(74) *Attorney, Agent, or Firm* — James Hasselbeck

(57) ABSTRACT

A subassembly for adsorbing hydrocarbons with an air intake system of a motor vehicle is provided. The subassembly includes a plurality of stacked layers constructed of a hydrocarbon adsorbing material. The plurality of stacked layers includes at least one lowermost layer and an uppermost layer. The at least one lowermost layer includes a solid shape within an outer boundary. The at least one lowermost layer is adapted for attachment to a component of the air intake system. The uppermost layer includes an opening such that the uppermost layer provides access from an upper side of the subassembly to the at least one lowermost layer through the opening for attaching the subassembly to the component.

17 Claims, 2 Drawing Sheets

(56) References Cited

U.S. PATENT DOCUMENTS

| | | | |
|---|---|---|---|
| 2005/0081717 A1* | 4/2005 | Meiller | B01D 53/02 96/154 |
| 2005/0139077 A1* | 6/2005 | Garikipati | B01D 53/0415 96/130 |
| 2009/0065436 A1* | 3/2009 | Kalayci | B01D 39/1623 210/679 |
| 2009/0090245 A1* | 4/2009 | Olszewski | B01D 46/0005 96/154 |
| 2009/0261032 A1 | 10/2009 | Gohle et al. | |
| 2011/0072974 A1* | 3/2011 | Patel | B01D 53/02 96/147 |
| 2014/0109878 A1* | 4/2014 | Bellis | B01D 53/0407 123/519 |

\* cited by examiner

HYDROCARBON ADSORBER AND RELATED MANUFACTURING METHODS

FIELD

The present disclosure relates to a hydrocarbon adsorber and related methods of manufacturing and assembling a hydrocarbon adsorber. More particularly, the present disclosure relates to a hydrocarbon adsorber that may be sonically welded to an air induction system.

BACKGROUND

This section provides background information related to the present disclosure and is not necessarily prior art.

Air induction systems are used in motor vehicles and for other applications to transport air from the environment to an engine for combustion. While operating, the engine continuously draws air through the air induction system and into the combustion chamber. When the engine shuts down, or otherwise ceases operating, air may flow in the reverse direction, into the air induction system and the environment from the combustion chamber or other portions of the engine. Air that flows from the engine into the air induction system may include hydrocarbons, formed by the evaporation or vaporization of un-combusted fuel. Government regulations require that the amount of hydrocarbons in the air that flows from the engine and into the atmosphere be minimized. For this reason, a hydrocarbon adsorber may be placed within a portion of the air induction system. The hydrocarbon adsorber can adsorb hydrocarbons that might otherwise be released into the atmosphere from the engine after engine shutdown.

While known hydrocarbon adsorbers have proven to be acceptable for their intended purposes, a continuous need for improvement in the relevant art remains. In this regard, it would be desirable to provide a hydrocarbon adsorber, and a related method of manufacturing and assembling a hydrocarbon adsorber, that would allow for the use and assembly of the hydrocarbon adsorber in a modular manner across various vehicles and/or vehicle platforms.

SUMMARY

This section provides a general summary of the disclosure, and is not a comprehensive disclosure of its full scope or all of its features.

According to one particular aspect, the present disclosure provides a subassembly for adsorbing hydrocarbons with an air intake system of a motor vehicle. The subassembly may include a plurality of stacked layers constructed of a hydrocarbon adsorbing material. The plurality of stacked layers may include at least one lowermost layer and an uppermost layer. The at least one lowermost layer may include a solid shape within an outer boundary. The at least one lowermost layer may be adapted for attachment to a component of the air intake system. The uppermost layer may include an opening such that the uppermost layer provides access from an upper side of the subassembly to the at least one lowermost layer through the opening for attaching the subassembly to the component.

In some configurations, each of the at least one lowermost layer and the uppermost layer may include a generally circular outer perimeter.

In some configurations, the subassembly may be generally cylindrical.

In some configurations, the opening of the uppermost layer may be generally circular.

In some configurations, the opening of the uppermost layer may be concentrically located relative to the outer boundary.

In some configurations, the subassembly may include an adhesive disposed between the uppermost layer and the at least one lowermost layer.

In some configurations, the subassembly may include at least one intermediate layer disposed between the at least one lowermost layer and the uppermost layer, the at least one intermediate layer including an opening such that the at least one intermediate layer provides access from the upper side of the subassembly to the at least one lowermost layer through the opening of the at least one intermediate layer for attaching the subassembly to the component.

In some configurations, the opening of the at least one intermediate layer may be aligned with the opening of the uppermost layer.

In some configurations, an adhesive may be disposed between the uppermost layer and the at least one intermediate layer and between the lowermost layer and the at least one intermediate layer.

According to another particular aspect, the present disclosure provides a component for an air intake system of a motor vehicle. The component may include a housing and a subassembly for adsorbing hydrocarbons. The housing may include an input port for receiving a source of intake air and an output port in fluid communication with an engine of the motor vehicle. The subassembly may include a plurality of stacked layers constructed of a hydrocarbon adsorbing material. The plurality of stacked layers may include at least one lowermost layer and an uppermost layer. The at least one lowermost layer may include a solid shape within an outer boundary. The at least one lowermost layer may be adapted for attachment to the housing. The plurality of stacked layers may include an uppermost layer defining an opening such that the uppermost layer provides access from an upper side of the subassembly to the at least one lowermost layer through the opening for attaching the subassembly to the housing.

According to yet another particular aspect, the present disclosure provides a method for controlling hydrocarbon emissions from a vehicle. The method may include a providing a hydrocarbon adsorber having first and second layers of a hydrocarbon adsorbing material. The second layer of the hydrocarbon adsorbing material may be supported by the first layer of the hydrocarbon adsorbing material. The second layer may include a through hole configured to provide access to the second layer. The method may also include placing the hydrocarbon adsorber in an air intake system of the vehicle such that the first layer is in contact with a component of the air intake system. The method may further include placing a sonic welding tool in the through hole and sonically welding the first layer to the component Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
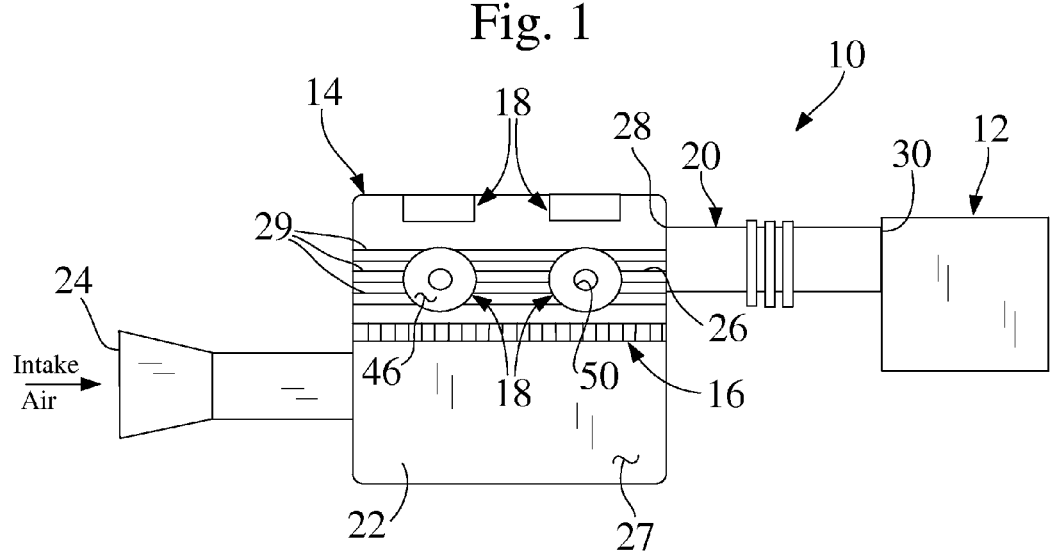
FIG. 1 is a simplified schematic view of an air induction system including a hydrocarbon adsorber in accordance with the teachings of the present disclosure, the air induction system shown operatively associated with a source of intake air and a vehicle engine.

With initial reference to FIG. 1, a simplified view of an air induction system 10 constructed in accordance with the present teachings is illustrated. The air induction system 10 may be used to transport and filter air from and between the environment and an engine 12 or other device utilizing a flow of air. The engine 12 may be an internal combustion engine for a motor vehicle (not shown). It will be understood, however, that the present teachings are not limited to this exemplary use. Rather, the present teachings may be readily adapted for use with other combustion engines utilized in other applications.

Figure 2:
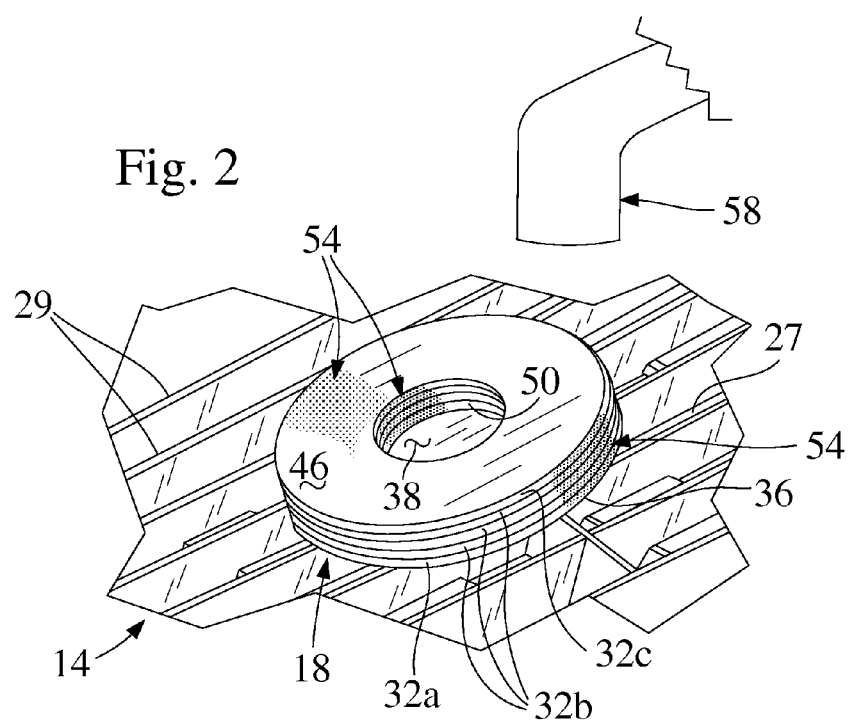
FIG. 2 is a perspective view of the hydrocarbon adsorber of FIG. 1 disposed within a portion of the air induction system.

As shown in FIG. 1, the air induction system 10 may generally include an air filter housing 14, an air filter 16 in the air filter housing 14, at least one hydrocarbon adsorber 18, and a duct 20. The air filter housing 14 may define a working chamber 22 and may include an inlet 24 in fluid communication with the environment (e.g., source of intake air) and an outlet 26 in fluid communication with the duct 20. With reference to FIGS. 1 and 2, the air filter housing 14 may also include an inner surface 27 having a plurality of fins or ribs 29 extending therefrom. The filter 16 may be disposed between the inlet 24 and the outlet 26. The filter 16 may conventionally filter or clean the air as it travels through the housing 14 from the environment to the duct 20. The duct 20 includes a first end 28 and a second end 30. The first end 28 may pass through the outlet 26 of the housing 14 and may extend into the working chamber 22. The second end 30 of the duct 20 may be secured in fluid communication with the engine 12 in any manner well known in the art.

Figure 4:
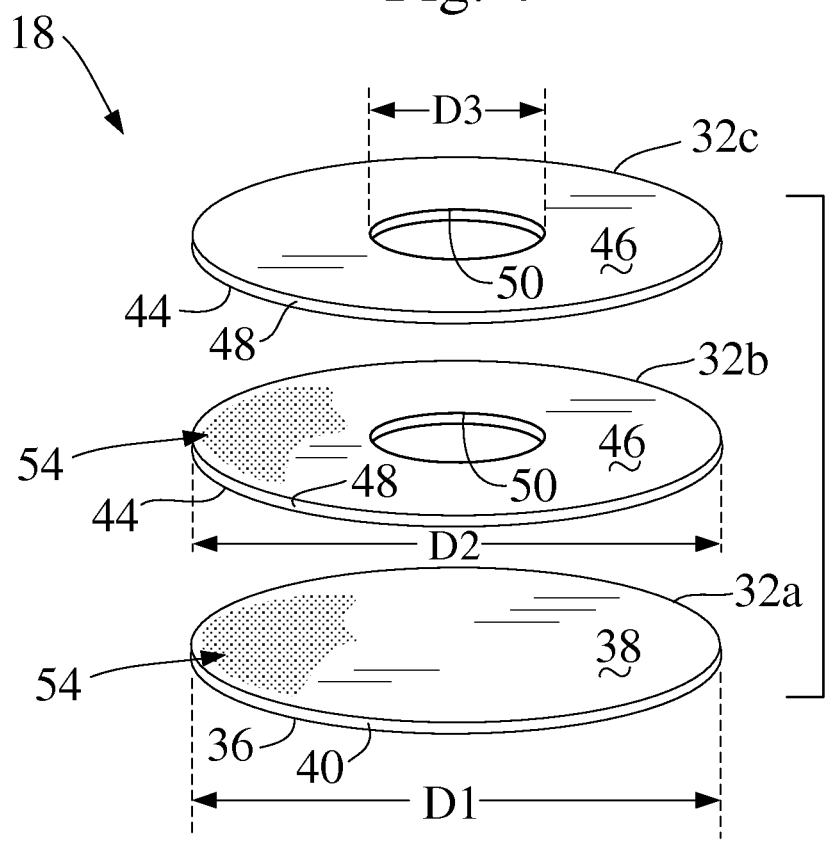
FIG. 4 is an exploded view of the hydrocarbon adsorber of FIG. 1.

As illustrated in FIGS. 1 and 2, the hydrocarbon adsorber 18 may be disposed within the air filter housing 14. In this regard, as illustrated in FIG. 1, the air filter housing 14 may include a plurality of hydrocarbon adsorbers. With reference to FIGS. 2 and 4, the hydrocarbon adsorber 18 may include a layered construct having a plurality of layers 32. At least one layer 32 of the hydrocarbon adsorber 18 may be formed from a material configured to adsorb hydrocarbons from the air. In some configurations, each layer 32 of the hydrocarbon adsorber 18 may be formed from a material configured to adsorb hydrocarbons from the air. For example, the layers 32 may be formed from a plastic material such as a fibrous layer or a fibrous sheet enclosing or containing or impregnated with or otherwise including, activated carbon. The layers 32 may alternately be paper filter media that is impregnated with or encloses activated carbon. It will also be appreciated that activated carbon may be disposed between each of the plurality of layers 32.

As illustrated, the hydrocarbon adsorber 18 may include a first or lowermost layer 32a, a second or intermediate layer 32b, and a third or uppermost layer 32c. It will be appreciated that while the hydrocarbon adsorber 18 is described as having a single intermediate layer 32b, in some configurations the hydrocarbon adsorber 18 may include a plurality of intermediate layers 32b, as illustrated in FIG. 2. For example, in some configurations, the hydrocarbon adsorber 18 may include two, three, four or five intermediate layers 32b. In other configurations, the hydrocarbon adsorber 18 may include more than five intermediate layers 32b. In certain applications, the hydrocarbon adsorber 18 may include at least three intermediate layers 32b.

With reference to FIG. 4, the lowermost layer 32a may include a bottom or mounting surface 36, an upper or mating surface 38, and an outer or peripheral boundary or surface 40 extending from and between the mounting and mating surfaces 36, 38. In some configurations, the mounting and mating surfaces 36, 38 may include a generally circular shape defining a first diameter D1, such that the lowermost layer 32a includes a generally cylindrical shape or construct. It will be appreciated, however, that the mounting and mating surfaces 36, 38 may include other shapes within the scope of the present teachings. For example, in some configurations the mounting and mating surfaces 36, 38 may include or otherwise define a rectangle, a hexagon, an octagon, or another suitable shape, such that the lowermost layer 32a includes a rectangular, hexagonal, or orthogonal prism, respectively.

The intermediate layer 32b may include a bottom or first mating surface 44, an upper or second mating surface 46, and an outer or peripheral boundary or surface 48 extending from and between the mounting and mating surfaces 44, 46. In some configurations, the first and second mating surfaces 44, 46 may include a generally circular shape defining a second diameter D2, such that the intermediate layer 32b includes a generally cylindrical shape or construct. The second diameter D2 may be substantially equal to the first diameter D1. It will be appreciated, however, that, like the mounting and mating surfaces 36, 38 of the lowermost layer 32a, the first and second mating surfaces 44, 46 of the intermediate layer 32b may include other shapes within the scope of the present teachings. In this regard, the size and/or shape of the intermediate layer 32b, as defined at least in part by the peripheral surface 48, may be substantially similar to the size and/or shape of the lowermost layer 32a. In other applications, however, the shape or size of the intermediate layer 32b may depart from the shape or size of the lowermost layer 32a.

The intermediate layer 32b may further include a through-hole or opening 50 extending from and between the first and second mating surfaces 44, 46. The opening 50 may be concentrically located relative to the peripheral surface 48 of the intermediate layer 32b. In some configurations, the opening 50 may include a generally circular shape defining a third diameter D3. The size of the third diameter D3 may be between twenty percent and eighty percent of the size of the second diameter D2. In some configurations, the size of the third diameter D3 may be substantially equal to thirty-three percent of the size of the second diameter D2. While the opening 50 is illustrated and described herein as including a generally circular shape, it will be appreciated that the opening 50 may include other shapes within the scope of the present disclosure. In some applications, an area of the opening 50 may be no greater than fifty percent of an area defined by a perimeter of the intermediate layer 32b. In other applications, the area of the opening 50 may be no less than ten percent of the area defined by the perimeter of the intermediate layer 32b. In some configurations, the opening may include a rectangular, hexagonal, or octagonal shape. As shown, the opening 50 is centrally positioned. It will be understood, however, that the opening 50 may be alternatively positioned within the scope of the present teachings.

The uppermost layer 32c may be substantially similar to the intermediate layer 32b, except as otherwise provided herein. Accordingly, like numerals will be used to describe like features and components. In this regard, the uppermost layer 32c may include the bottom or first mating surface 44, the upper or second mating surface 46, the peripheral boundary or surface 48 extending from and between the mounting and mating surfaces 44, 46, and the opening 50 extending from and between the first and second mating surfaces 44, 46.

Figure 3:
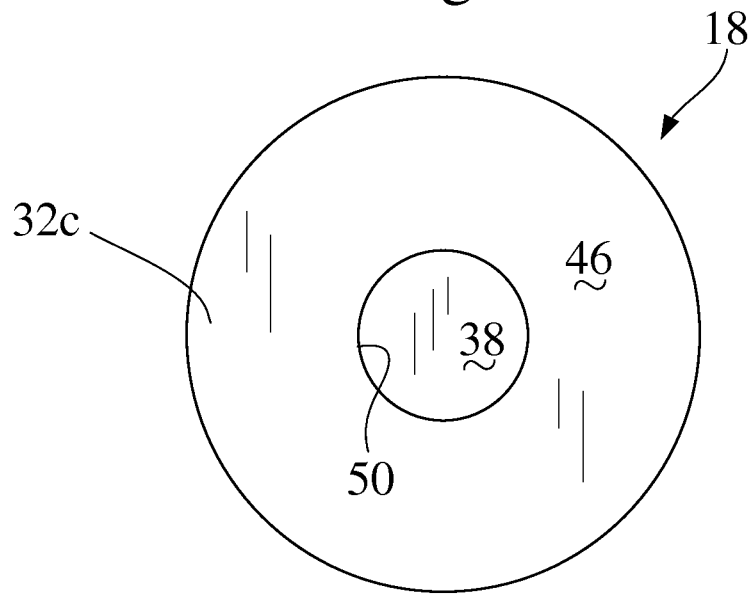
FIG. 3 is a top view of the hydrocarbon adsorber of FIG. 1.

In an assembled configuration, the intermediate layer 32b may be disposed and supported between the lowermost layer 32a and the uppermost layer 32c, such that the first mating surface 44 of the intermediate layer 32b is adjacent to the mating surface 38 of the lowermost layer 32a, and the second mating surface 46 of the intermediate layer 32b is adjacent to the first mating surface 44 of the uppermost layer 32c. It will be appreciated that, if the hydrocarbon adsorber 18 includes more than one intermediate layer 32b, the first mating surface 44 of at least one of the intermediate layers 32b may be adjacent to the second mating surface 46 of another of the intermediate layers 32b. Accordingly, as illustrated, in the assembled configuration the mounting surface 36 of the lowermost layer 32a and the second mating surface 46 of the uppermost layer 32c may each be exposed surfaces. The peripheral surfaces 40, 48 of the uppermost, intermediate, and lowermost layers 32a, 32b, 32c may be aligned, such that the opening 50 of the intermediate layer 32b is aligned with the opening 50 of the uppermost layer 32c. Accordingly, as illustrated in FIGS. 2 and 3, in the assembled configuration a portion of the mating surface 38 of the lowermost layer 32a may be visible, and otherwise accessible, through the openings 50 of the intermediate and uppermost layers 32b, 32c.

With particular reference to FIG. 4, a method of assembling or otherwise manufacturing the hydrocarbon adsorber 18 will be understood to include cutting, stamping, or otherwise providing the lowermost, intermediate and uppermost layers 32a, 32b, 32c from a stock of the hydrocarbon adsorbing material described above, and cutting, stamping, drilling or otherwise creating the opening 50 in the intermediate and uppermost layers 32b, 32c. The lowermost, intermediate and uppermost layers 32a, 32b, 32c can be stacked or otherwise assembled such that the intermediate layer 32b is supported between the lowermost and uppermost layers 32a, 32c. A sealer or adhesive 54 may be applied to the mating surface 38 of the lowermost layer 32a, the first and second mating surfaces 44, 46 of the intermediate layer 32b, and/or the first mating surface 44 of the uppermost layer 32c. Accordingly, the adhesive 54 may help to ensure that the intermediate layer 32b adheres or is otherwise fixed to the lowermost and uppermost layers 32a, 32c.

With reference to FIGS. 2 and 4, the method of manufacturing the hydrocarbon adsorber 18 may also include applying the adhesive 54 to the peripheral and mounting surfaces 40, 36 of the lowermost layer 32a, to the peripheral surface 48 and the opening 50 of the intermediate layer 32b, and/or to the peripheral and second mating surfaces 48, 46 and the opening 50 of the uppermost layer 32c. In this regard, the adhesive 54 may be applied to the hydrocarbon adsorber 18 such that the exposed surfaces of the hydrocarbon adsorber include a film or layer of the adhesive 54. In some configurations, the hydrocarbon adsorber 18 may be dipped into a source of adhesive 54. In other configurations, the hydrocarbon adsorber 18 may be exposed to a flow of adhesive 54. Preferably, the adhesive 54 is applied to the hydrocarbon adsorber 18 in a waterfall type process to seal the edges of the hydrocarbon adsorber 18. The adhesive 54 is selected to be compatible with the materials used to construct the hydrocarbon adsorber 18 and compatible with the fluids or vapors that may be present in the air induction system. It will also be appreciated that the adhesive 54 may be applied to the hydrocarbon adsorber 18 using other suitable techniques. In yet other configurations, the lowermost, intermediate and/or uppermost layer 32a, 32b, 32c may be formed from a hydrocarbon adsorbing material that does not require a sealer. For example, in some configurations the lowermost, intermediate and/or uppermost layer 32a, 32b, 32c may be formed from a paper or synthetic filter media into which the hydrocarbon adsorber material is fixedly impregnated and which therefore does not require sealing with a sealer.

With reference to FIG. 2, a method of assembling the hydrocarbon adsorber 18 may include placing the hydrocarbon adsorber 18 in a portion of the air induction system 10. As illustrated, in some configurations, the hydrocarbon adsorber 18 may be placed on the inner surface 27 of the air filter housing 14. In this regard, in some configurations the mounting surface 36 of the lowermost layer 32a may be supported on or by the rib(s) 29 of the air filter housing 14. A portion 58 of a sonic welder (not shown) may be disposed or otherwise placed within the openings 50 of the intermediate and uppermost layers 32b, 32c and/or into contact with the exposed portion of the mating surface 38 of the lowermost layer 32a. The sonic welder may then be activated to sonically weld the mounting surface 36 of the lowermost layer 32a to the rib(s) 29 of the air filter housing 14.

When the engine 12 is operating, air from the environment may generally travel through the air induction system 10 to the engine 12 by passing through the air filter housing 14 and the duct 20. As the air passes through the air filter housing 14, the air is filtered by the air filter 16. When the engine shuts down or otherwise ceases operating, air containing hydrocarbons may generally travel through air induction system 10, including the duct 20 and the air filter housing 14, from the engine 12. As the air containing hydrocarbons travels through the air induction system 10, the hyrdrocarbons can be adsorbed by the hydrocarbon adsorber 18.

It will be appreciated that the configuration of the hydrocarbon adsorber 18, including the exposed mounting surface 36 of the lowermost layer 32a, and the opening 50 formed in the intermediate and uppermost layers 32b, 32c, can make it easier to mount the hydrocarbon adsorber 18 directly to a portion of the air induction system 10 (e.g., the rib(s) 29 of the air filter housing 14) using the sonic welder. In this regard, it will also be appreciated that the configuration of the hydrocarbon adsorber 18, including the exposed mounting surface 36, can improve the modularity of the hydrocarbon adsorber 18, such that the hydrocarbon adsorber can be used in various air induction systems having various, and differing (e.g., size, shape, etc.), air filter housings.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A subassembly for adsorbing hydrocarbons with an air intake system of a motor vehicle, the subassembly comprising:
a plurality of stacked layers constructed of a hydrocarbon adsorbing material, the plurality of stacked layers including at least one lowermost layer having a solid shape within an outer boundary, the at least one lowermost layer adapted for attachment to a component of the air intake system, the plurality of stacked layers further including an uppermost layer, the uppermost layer having an opening such that the uppermost layer provides access from an upper side of the subassembly to the at least one lowermost layer through the opening for attaching the subassembly to the component.

2. The subassembly of claim 1, wherein each of the at least one lowermost layer and the uppermost layer each have a generally circular outer perimeter.

3. The subassembly of claim 2, wherein the subassembly is generally cylindrical.

4. The subassembly of claim 2, wherein the opening of the uppermost layer is generally circular.

5. The subassembly of claim 1, wherein the opening of the uppermost layer is concentrically located relative to the outer boundary.

6. The subassembly of claim 1, further comprising an adhesive disposed between the uppermost layer and the at least one lowermost layer.

7. The subassembly of claim 1, further comprising at least one intermediate layer disposed between the at least one lowermost layer and the uppermost layer, the at least one intermediate layer including an opening such that the intermediate layer provides access from the upper side of the subassembly to the at least one lowermost layer through the opening of the at least one intermediate layer for attaching the subassembly to the component.

8. The subassembly of claim 7, wherein the opening of the at least one intermediate layer is aligned with the opening of the uppermost layer.

9. The subassembly of claim 7, further comprising an adhesive disposed between the uppermost layer and the at least one intermediate layer and between the at least one lowermost layer and the at least one intermediate layer.

10. A component for an air intake system of a motor vehicle, the component comprising:
a housing including an input port for receiving a source of intake air and an output port in fluid communication with an engine of the motor vehicle; and
a subassembly for adsorbing hydrocarbons, the subassembly including a plurality of stacked layers constructed of a hydrocarbon adsorbing material, the plurality of stacked layers including at least one lowermost layer having a solid shape within an outer boundary, the at least one lowermost layer adapted for attachment to the housing, the plurality of stacked layers further including an uppermost layer defining an opening such that the uppermost layer provides access from an upper side of the subassembly to the at least one lowermost layer through the opening for attaching the subassembly to the housing.

11. The component of claim 10, wherein each of the at least one lowermost layer and the uppermost layer has a generally circular outer perimeter.

12. The component of claim 11, wherein the subassembly is generally cylindrical.

13. The component of claim 11, wherein the opening of the uppermost layer is generally circular.

14. The component of claim 10, wherein the at least one lowermost layer of the subassembly is sonically welded to the housing.

15. The component of claim 10, wherein the housing defines a plurality of ribs and further wherein the at least one lowermost layer of the subassembly is sonically welded to at least one of the plurality of ribs.

16. The component of claim 10, wherein the component is an air box.

17. The subassembly of claim 10, further comprising at least one intermediate layer disposed between the lowermost layer and the uppermost layer, the at least one intermediate layer including an opening such that the intermediate layer provides access from the upper side of the subassembly to the at least one lowermost layer through the opening of the at least one intermediate layer for attaching the subassembly to the housing.

* * * * *